July 7, 1942.　　　　F. W. SCHARF　　　　2,288,748
AUTOMATIC TOASTER
Filed July 12, 1940　　　　4 Sheets-Sheet 1
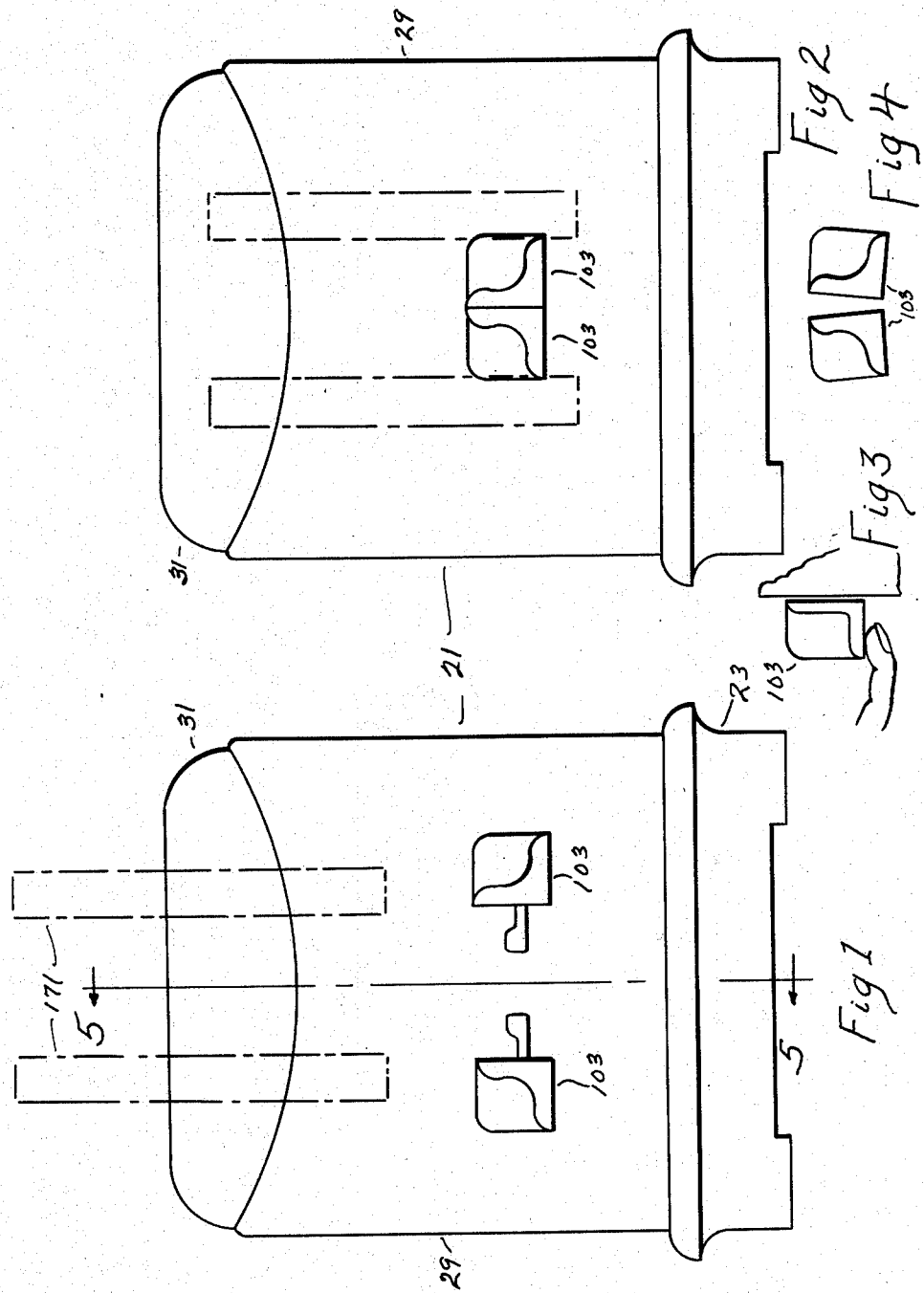
INVENTOR
Frank W. Scharf
BY
ATTORNEYS

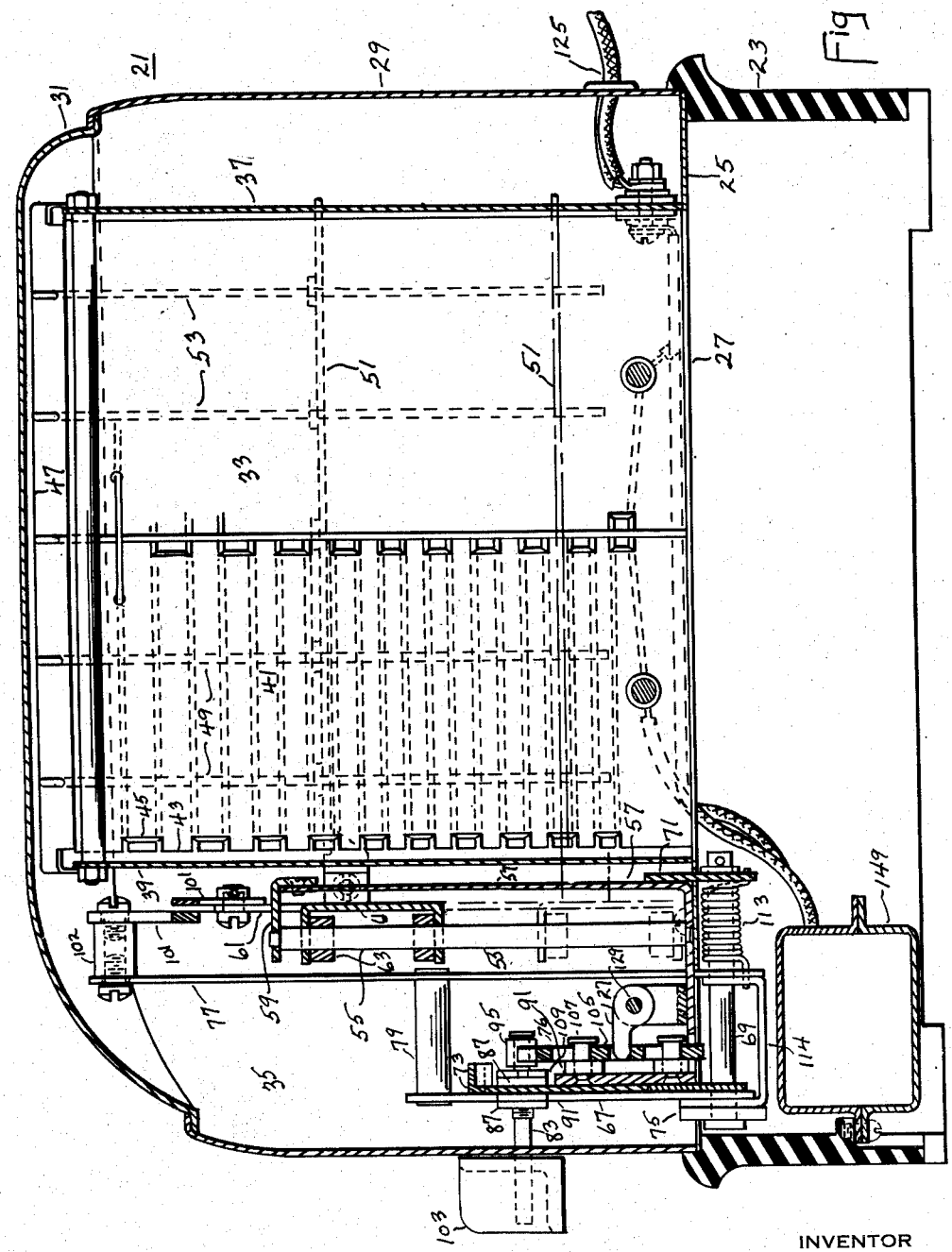

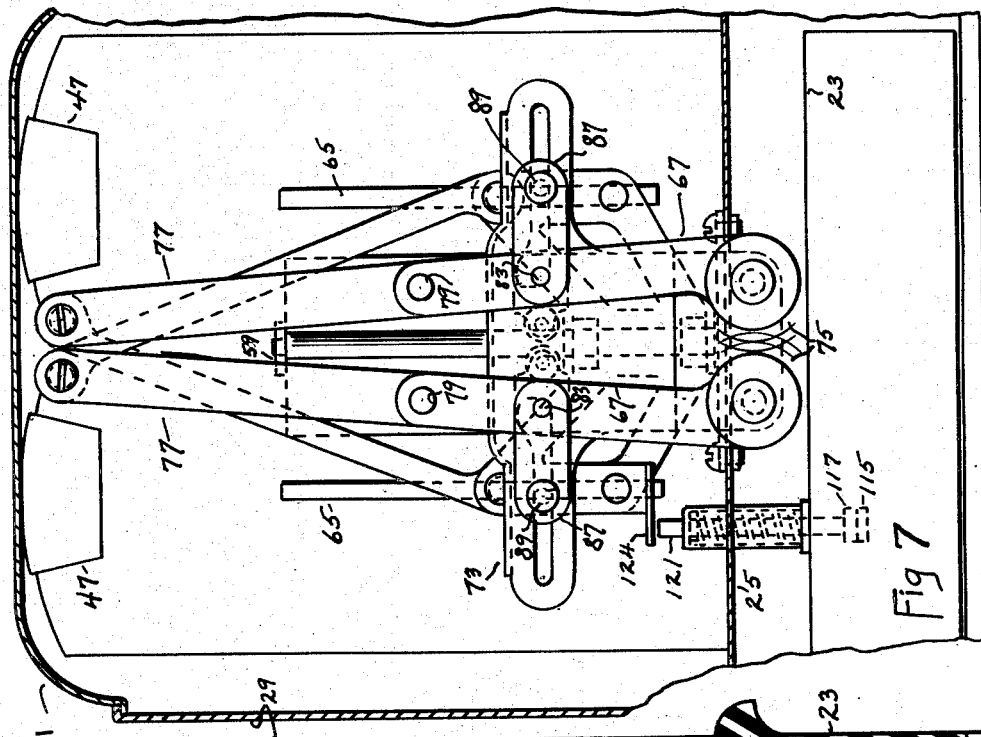
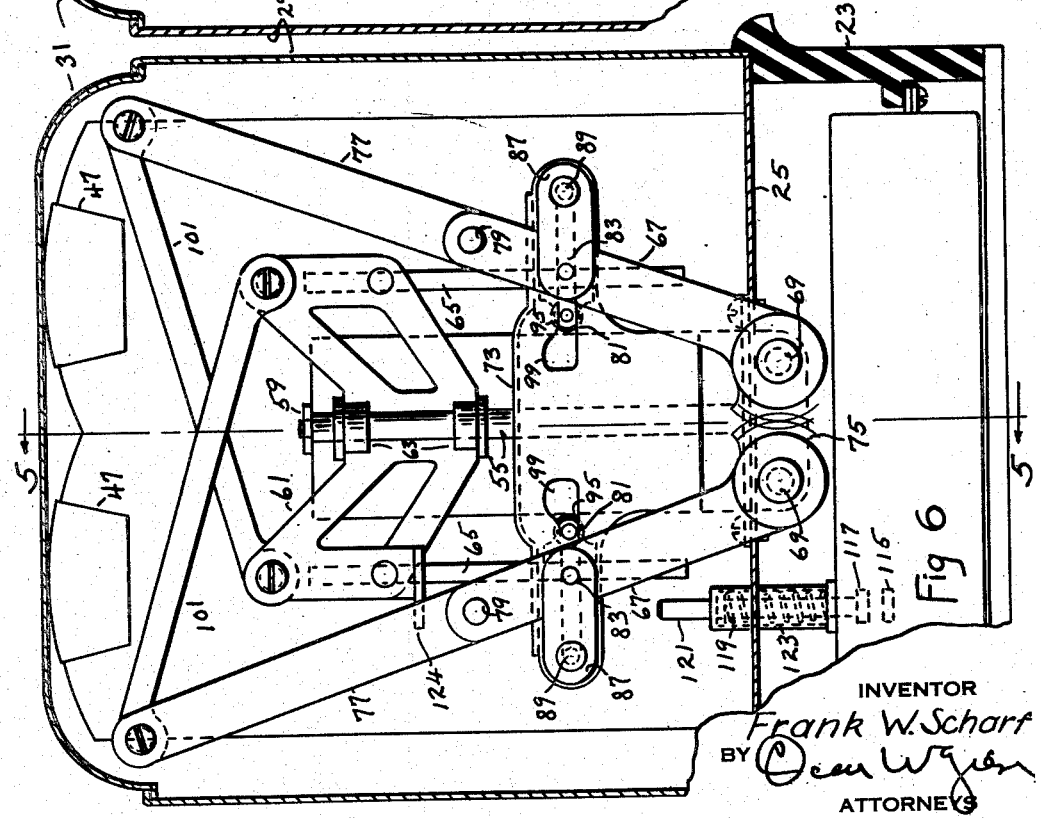

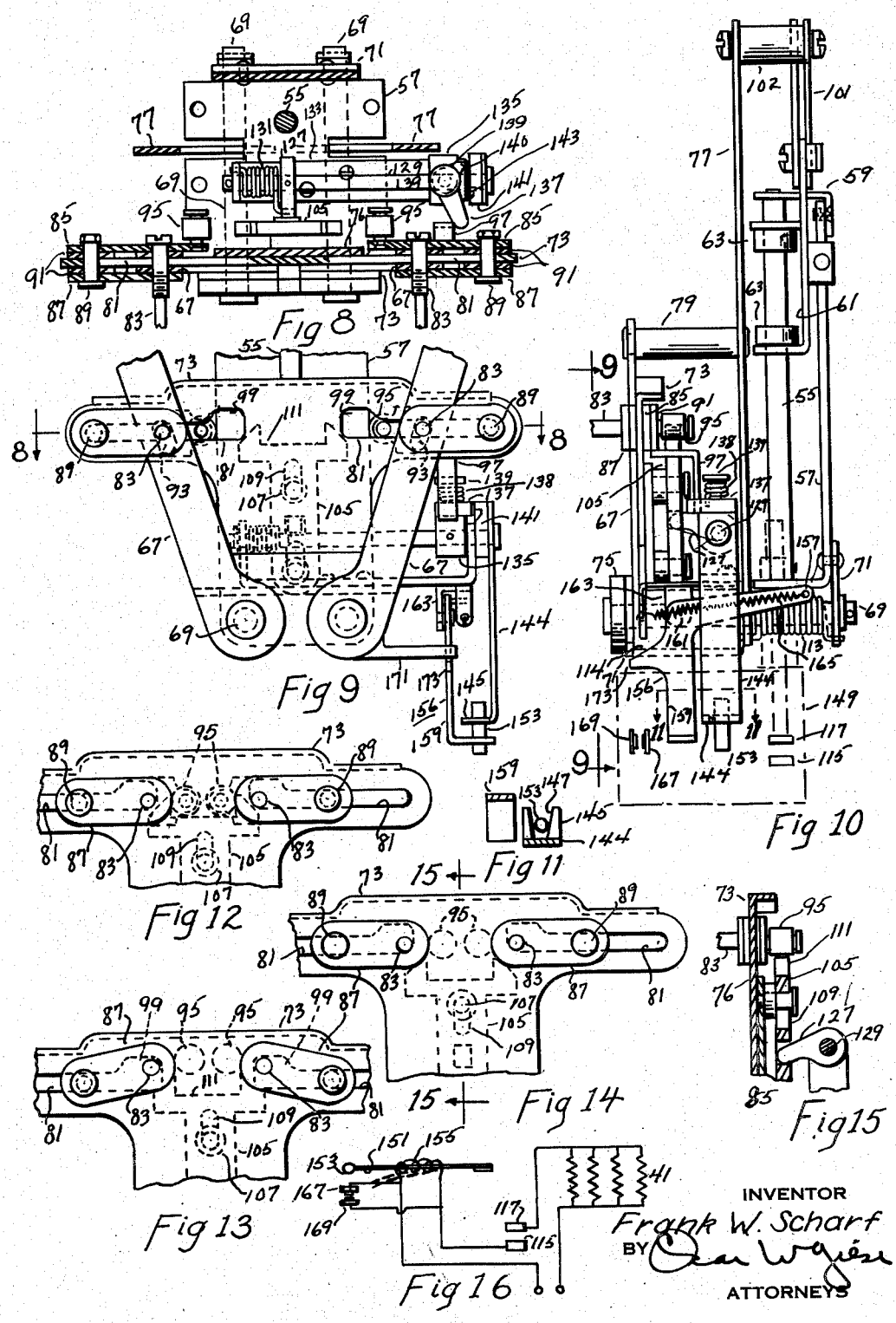

Patented July 7, 1942

2,288,748

UNITED STATES PATENT OFFICE 2,288,748

AUTOMATIC TOASTER

Frank W. Scharf, Marshall, Mich., assignor to McGraw Electric Company, Elgin, Ill., a corporation of Delaware Application July 12, 1940, Serial No. 345,192

6 Claims. (Cl. 219—19)

My invention relates to electric cooking devices and particularly to electric toasters.

An object of my invention is to provide a novel form of mechanism in an electric toaster for moving a bread carrier from non-toasting to toasting position.

Another object of my invention is to provide a carrier-moving means requiring balanced opposing pressures to cause movement of the carrier into toasting position.

Another object of my invention is to provide a plural latch and detent means for holding a bread carrier in toasting position requiring simultaneous movement of the latches to effect release of the carrier from toasting position.

Other objects of my invention will either be apparent from the following description of the preferred form of my invention or will be set forth therein and will also be set forth in the appended claims.

In the drawings,

Figure 1 is a view in front elevation of a toaster embodying my invention, shown in normal position ready for a toasting operation, Figure 2 is a view similar to Fig. 1 with parts shown in their operating positions, Fig. 3 is a fragmentary view in side elevation, showing manual actuation of the knobs to terminate a toasting operation, Fig. 4 is a fragmentary view in front elevation of the knobs shown in Fig. 3, Fig. 5 is a vertical longitudinal section through a toaster embodying my invention taken on the line 5—5 of Figs. 1 and 6, Fig. 6 is a view partially in front elevation and partially in section showing the carrier-moving means in initial position, Fig. 7 is a view similar to Fig. 6 but showing the carrier-moving means in actuating or operating positions, Fig. 8 is a fragmentary horizontal sectional view through the carrier-moving means taken on the line 8—8 of Fig. 9, Fig. 9 is a fragmentary view in front elevation taken on the line 9—9 of Fig. 10, Fig. 10 is a fragmentary side elevational view of the carrier-moving means, Fig. 11 is a fragmentary horizontal sectional view taken on the line 11—11 of Fig. 10, Fig. 12 is a fragmentary front elevational view showing the operating positions of the latch and detent means, Fig. 13 is a view similar to Fig. 12 but showing the latch members disengaged from the detent and corresponding to the position of the knobs shown in Fig. 4 of the drawings, Fig. 14 is a view similar to Fig. 12 but showing the detent moved into latch-disengaging position, Fig. 15 is a fragmentary vertical sectional view taken on the line 15—15 of Fig. 14, and, Fig. 16 is a diagram of connections used in my improved toaster.

An electric toaster designated in its entirety by the numeral 21 includes a suitable skeleton frame 23 which may be of moulder composition material, and which has secured against the upper face thereof a bottom plate 25, which bottom plate may be provided with longitudinally-extending ventilating openings 27 in a manner now well known in the art. The assembly 21 includes also a casing 29 which, in the embodiment shown in the drawings, includes two side walls and front and rear walls and cooperates with a cover 31 to enclose the assembly, there being a toasting chamber 33 and a mechanism chamber 35 within the casing. The toasting chamber 33 is defined in part by a rear intermediate wall 37, a front intermediate wall 39 and the outside vertically-extending planar electric heating units 41, of which I provide a spaced pair for each slice of bread adapted to be toasted in the toaster at one time. Each electric heating unit includes one or more plates 43 of electric-insulating material, such as mica, having wound thereon a resistor strip or wire 45, all in a manner well known in the art.

The lower ends of the respective heating units 41 may have interfitting engagement (not shown in the drawings) with the bottom plate 25 and the upper ends thereof may be held by suitable top frame plates 47, all in a manner now well known in the art. It is to be understood that the cover 31 and the respective frame plates 47 are provided with longitudinally extending apertures to permit of insertion and removal of a slice of bread in the operation of the toaster. A plurality of vertical guard wires 49 are provided as is usual in toasters of this general kind.

Means for supporting a slice or slices of bread in the toasting chamber may comprise one or more bread carriers 51 which are vertically movable in the toasting chamber, the bread being prevented from contacting the resistor wire or strip 45 by the guard wires in a manner well known in the art. Means for movably supporting the bread carrier may comprise a vertical standard 55, the lower end of which may fit into the lower part of a bracket 57 suitably secured against the bottom plate 25 in the mechanism chamber 35 and the upper end of the standard 55 may interfit with an extension 59 secured to the upper end of bracket 57.

A carriage 61 having two bearing bushings 63 thereon fitting around the standard 55 has a rear extension suitably connected with the forward end of the carrier 51 which carrier extends through a vertical slot 65 in the front intermediate wall 39. It is to be understood that where I have used the word "carrier" I do so merely for convenience since I have shown a two-slice toaster and it is to be understood that the same terms apply as to the connection between the carriage 61 and one or more bread carriers 51. The rear ends of the respective carriers slide in suitable slots provided in the rear intermediate plate 37.

Means for moving the bread carrier or carriers vertically on the standard 55 comprise a pair of short lever arms 67 pivotally mounted at their lower ends on a pair of stub shafts 69, the rear ends of which may be supported by a bearing bar 71 secured to bracket 57 and the forward ends of which may be supported by a flat frame 73, of generally T-shape, suitably secured against a front vertical portion of bracket 57. The lower end of each of the lever arms 67 is provided with a toothed sector 75 which toothed sectors are so designed and constructed that they mesh with each other as shown particularly in Figs. 6 and 7 of the drawings, so that the two lever arms must turn together. A pair of longer lever arms 77 are also fixedly mounted on the short shafts 69 between the front lever arms and the front wall 39, each arm 67 being aligned with an arm 77 and the upper end of each arm 67 being rigidly connected with an arm 77 by a stud 79. The frame 73 is provided with a pair of slots 81 extending in a substantially horizontal direction and symmetrically positioned relatively to the vertical center line of the frame 73.

A pair of actuating pins 83 are movable in the respective slots 81 and these pins respectively fit into and mechanically connect the inner ends of a rear link 85 and a front link 87, one of each of which are provided adjacent to the two side portions of frame 73. The outer ends of the two links 85 and 87 are connected by a pin 89 and suitable washers 91 are provided on the pins 89 and the pins 83 respectively so that when the pins 83 are moved toward each other by simultaneous contracting pressure by an operator, the links 85 and 87 and the pins 83 and 89 will move easily in the frame 73, it being understood that the pins 83 and 89 move in the slots 81 whereby these movable parts are caused to move in a substantially horizontal direction.

The respective lever arms 67 are provided with a short elongated slot 93 through which the pins or shafts 83 extend, which slots permit of a small upward movement of the pins 83 for a reason to be hereinafter set forth. The rear links 85 are each provided with a latching roller 95 and the right-hand link 85 is provided with a depending actuating member 97 for a purpose to be hereinafter referred to. The respective slots 81 are provided with a widened inner end portion 99 shown more particularly in Figs. 6 and 9 of the drawings, to permit of the pins 83 being moved upwardly as has just been hereinbefore described, and the purpose of such movement will be referred to hereinafter.

The respective upper ends of the long lever arms 77 have pivotally connected therewith links 101, by means of rods 102, the other ends of each of which are pivotally connected to the carriage 61 which is vertically movable on the vertical standard 55 as has been hereinbefore set forth. As will be seen from Fig. 6 of the drawings, the two links 101 cross each other at an obtuse or relatively large angle when referring to the upper one of the four angles defined by the longitudinal axes of the two links.

The carriage 61, and therefore the bread carriers 51 connected therewith, are moved downwardly into toasting position by cooperating and simultaneous movement of the two lever arms 67 which movement is effected manually by contracting simultaneous pressure on knobs 103, one of each of which is secured to the forward end of the pins 83. Means for retaining the bread carriers in their lowermost or toasting position, the position of the lever arms and links at this time being shown in Fig. 7, comprises a detent member 105 slidably mounted at the rear of frame 73 as by a pair of fixed pins 107 mounted in the front portion 76 of bracket 57. The detent 105 is provided with elongated slots 109 therein to receive the fixed pins 107 and permit of the sliding movement hereinbefore described. The upper end of the detent 105, which is of substantially T-shape, is provided with a recess 111 to receive the two rollers 95 hereinbefore described when these rollers have been moved toward each other in the manner already hereinbefore set forth. The use of such rollers 95 is preferred since the release between latch members and the detent can be effected very easily and quickly and with the application of a relatively small force applied to these parts.

Reference to Fig. 12 of the drawings will show the positions occupied by the latch members 95 and the detent 105 during a toasting operation when the levers and links occupy the position shown in Fig. 7 of the drawings.

If it is desired to manually terminate a toasting operation irrespective of any automatic control (to be hereinafter described) it is necessary that both knobs 103 be moved upwardly simultaneously, as is shown more particularly in Figs. 3 and 4, whereby the pins 83 enter the respective extension 99 of the horizontal slots 81 so that the latch rollers 95 will move into the position shown particularly in Fig. 13 of the drawings. The respective lever arms 67 are biased to the positions shown in Fig. 6 by coil springs 113 on the shafts 69, as seen more particularly in Fig. 5 of the drawings, whereby the carriage 61 is biased to its upper position and the bread carriers 51 connected therewith are biased to their non-toasting position. A connector 114 may have one end secured to a lever arm 67 and its other end to a lever arm 77 to insure simultaneous movements thereof. As soon as the latches 95 have been moved to their upper position as shown in Fig. 13, the springs 113 will cause separating movement of the pins 83 and of the lever arms 67 and 77 and the other parts connected therewith to move the bread carrier or carriers into raised or non-toasting position.

The electric heating elements 41 may be energized by a switch including a substantially fixed contact 115 (see Figs. 6 and 7) and a movable contact 117, which latter contact is normally biased to the position shown in Fig. 6 of the drawings by a spring 119 encircling a switch-actuating member or rod 121 positioned in a housing 123 in a manner which has been disclosed and claimed in co-pending application S. N. 279,386, filed June 16, 1939 by John R. Gomersall and assigned to the same assignee as is the present application. Extension plate 124 may be secured to a suitable part of the carriage 61 in such position thereon that it will engage rod 121 when the parts have been moved to the positions shown in Fig. 7 of the drawings, whereby the toast heating elements of the toaster are energized through a twin cord supply circuit conductor 125, all in a manner well known in the art. It is obvious that the supply of current to the heating elements is interrupted when the moving parts occupy the positions shown in Fig. 6 of the drawings to thereby terminate a toasting operation, which toasting operation was initiated when the parts were moved as already described to the positions shown in Fig. 7 of the drawings.

Automatic thermal timing means for terminating a toasting operation may be utilized in my toaster hereinbefore described and while these parts do not form a part of my invention, I have elected to show such thermal automatic timing and toasting operation-terminating means in order to show how much timing and terminating means can be applied to my toaster.

The detent 105 is engaged by a short lever arm 127 (see particularly Fig. 15) mounted on a short shaft 129 extending in a substantially horizontal direction and located between the main lever arm 77 and the detent 105 as will be seen by reference to Fig. 8 of the drawings. A biasing spring 131 has one end thereof fixedly mounted in a supporting bracket 133 carrying the shaft 129 while the other end engages the arm 127 which arm is fixed on the shaft 129 to turn therewith. The construction and arrangement of spring 131 is such as to yieldingly bias detent 105 to its latch-engaging position. A collar 135 (see Fig. 8) is fixedly mounted on shaft 129 spaced from the arm 127 and has mounted at substantially the top portion thereof a bell crank lever 137 which may turn on a pin 139 supporting the member 137 on collar 135. The bellcrank lever 137 is biased in a clockwise direction by a spring 138. When the parts are in the positions shown in Fig. 8 of the drawings, the extension 97 on link 85 will engage the longer arm of bellcrank lever 137 to cause it to turn to the position shown in Fig. 8 of the drawings, whereby the shorter arm 140 thereof will be moved out of engagement with a collar 141 loosely mounted on shaft 129, which collar is provided with a notch 143 as shown in Fig. 8 of the drawings for receiving the end of arm 140. The collar 141 has secured thereto a depending arm 144, the lower end of which has an inturned extension 145 provided with a notch or slot 147 (see Fig. 11), the purpose of which will hereinafter appear.

Any type of timing mechanism may be employed within the broader aspects of this invention. Merely for purpose of illustration, however, a thermal timer of the same general construction and operation as that disclosed and claimed in the above mentioned Gomersall application S. N. 279,386 may be used and is indicated generally at 149 in Fig. 10 and Fig. 5 of the drawings. Only such parts thereof as are necessary for understanding the operation are shown in the present application. A bimetal element 151 (see Fig. 16) of the kind disclosed and claimed in the above identified application has mounted at its flexing end a short bar 153 and the design and construction of this thermal timer is such that when the bread carriers are moved into their lowermost or toasting positions a small auxiliary heating element 155 thermally associated with the bitmetal bar 151 so that it will be energized simultaneously with the main heaters and cause the bimetal bar to flex and move member 153 toward the left, as seen in Fig. 10 of the drawings, thereby moving arm 144 in a clockwise direction. This movement of bimetal bar 151 continues until collar 141 has been turned sufficiently to permit the end of arm 140 of bellcrank lever 137 to move into recess 143, because of the bias given it by spring 138.

Means for deenergizing the auxiliary heater 155 may comprise a second bellcrank lever 156 comprising a substantially horizontally extending arm 157 and a depending arm 159 pivotally mounted at 161 on a suitable bracket 163. An over-center spring 165 (see Fig. 10) cooperates with arm 157 to hold the bell crank lever 156 in either one of two opposed limiting positions, the normal or initial one of which is shown in Fig. 10 of the drawings where the depending portion 159 is out of engagement with the movable contact 167 of a short circuiting switch which includes in addition to the movable contact 167 a fixed contact 169 of the general kind shown in the above identified Gomersall application. When member 153 has been moved to the left (as seen in Fig. 10) the required distance because of the heating of bimetal 151, the bellcrank lever 156 will be caused to move in a clockwise direction whereby an extension on the end of arm 159 will engage the movable contact member 167 (normally biased out of engagement with the fixed contact 169) and force it into engaging contact with fixed contact member 169 whereby to short circuit auxiliary heater 155. The function of the over-center spring 165 is to hold this bell crank lever 156 in the position into which it was moved and to thereby continue the short circuiting action of switch contacts 167 and 169.

As soon as the heating effect of auxiliary heater 155 has ceased, the bitmetal member 151 will cool and the member 153 will then be moved to the right (as seen in Fig. 10) and because of the inter-engagement of arm 140 with notch 143 this turning movement of arm 144 will cause a turning movement of shaft 129 in a counter-clockwise direction whereby arm 127 is also turned in a counter-clockwise direction and since it interfits with detent 105 (see Fig. 15) the detent 105 will be moved downwardly until it reaches its limiting position as shown in Figs. 14 and 15 of the drawings, so that the detent 105 is disengaged from the latch members 95 which have remained in their intial position into which they were manually moved as hereinbefore described.

When the links and lever arms and the parts connected therewith have moved to their initial normal and inoperative positions as shown in Figs. 6 and 8 of the drawings, the extension 97 engaging the longer arm of bellcrank lever arm 137 will force the short arm 140 out of the notch 143 and the biasing spring 131 will move detent 105 into its upper position as shown in Figs. 12 and 13 of the drawings. An extension 171 on right hand lever arm 67 is adapted to engage an extension 173 on the second bellcrank lever 156, when lever arms 67 move into the positions of Figs. 9 and 10, to cause the bellcrank lever 156 to turn in a counterclockwise direction and permit disengagement of contact 167 from contact 169. The parts of the toaster are thus returned to their normal or inoperative positions and it is only necessary to remove the toasted slices of bread 171 (see Fig. 1 of the drawings) in order to place the toaster in condition for another toasting operation.

Reference to Fig. 6 of the drawings will show that it is impossible to cause the hereinbefore described movement of the bread carriers into toasting position by pressure on only one of the actuating knobs 103 which, it will be noted, are moved in a direction substantially at right angles to the movement of the bread carrier or carriers. Thus, if pressure be applied to the left-hand knob 103, tending to force lever arm 67 to turn in a clockwise direction, the pressure exerted on link 101 and transmitted to the right-hand upper end of carriage 61 will cause the carriage to bind or lock on standard 55 thereby effectually preventing downward movement of the carriage on the standard. It is only when a balanced pressure is applied to carriage 61 as when both lever arms 67 are acted upon simultaneously by contracting and substantially equal pressures, that a downward movement of carriage 61 on the standard is possible because of the absence of any binding or locking tendency because of a one-sided application of a moving force to the carriage. It is to be noted that the design, construction and arrangement of the lever arms and the links is such as to obtain this action.

It may be further pointed out that it is necessary that both knobs 103 be moved manually in an upwardly direction to disengage latch rollers 95 from the detent 105 to permit of return of the linkage to its normal inoperative position as shown in Fig. 6 of the drawings to terminate a toasting operation at any desired time irrespective of the automatic terminating mechanism thereof. It will be further noted that manual termination moves a pair of latch members out of engagement with the detent while automatic termination of a toasting operation moves the detent out of engagement with the latch members.

While I have shown a specific embodiment of my invention it is obvious that the invention is not limited thereto and that modifications coming within the scope of the appended claims should be considered as being covered thereby.

I claim as my invention:

1. In an electric toaster comprising electric toast-heating means and a bread carrier movable into toasting and non-toasting positions relatively to the toast-heating means and normally yieldingly biased to non-toasting position, of a means including a pair of pivotally-mounted lever arms requiring balanced pressures thereon to cause movement of the carrier into toasting position, latch members pivotally connected to the respective lever arms, a detent for engaging said latch members to hold the carrier in toasting position, said latch members requiring simultaneous movement relatively to the detent for effecting release of the carrier from toasting position.

2. In an electric toaster, the combination with an electric toast-heating element and a bread carrier vertically movable into toasting and non-toasting positions relatively to the toast-heating element and yieldingly biased to non-toasting position, of means for causing movement of the carrier to toasting position comprising a pair of interconnected lever arms extending in a substantially vertical direction and pivotally mounted at their lower ends, a pair of actuating knobs pivotally connected with said lever arms, guide-slot means constraining movement of the actuating knobs to substantially horizontal paths, a carriage connected to said bread carrier, vertical guide means for the carriage, and a pair of crossed links conecting the upper ends of the lever arms to the carriage, the angle at which said links normally cross each other being such that substantially balanced contracting pressures on both knobs are required to cause movement of the bread carrier to toasting position.

3. A device as set forth in claim 2 and including a pair of latch members operatively mounted on said lever arms, a detent for engaging and holding said latch members when the bread carrier has been moved to toasting position, and means actuable by one of said lever arms for moving the detent into latch-engaging position.

4. A device as set forth in claim 2 and including a pair of latch members operatively mounted on said lever arms, a detent for engaging and holding said latch members when the bread carrier has been moved to toasting position, and means actuable by one of said lever arms for moving the detent into latch-engaging position, manual release of the carrier from toasting position requiring simultaneous movement of the pair of latch members relative to the detent.

5. In an electric toaster, the combination with an electric toast-heating element and a bread carrier vertically movable into toasting and non-toasting positions relatively to the toast-heating element and yieldingly biased to non-toasting position, of means for causing movement of the carrier to toasting position comprising a pair of interconnected lever arms pivotally mounted adjacent to each other at their lower ends and extending upwardly away from each other, a vertically movable carriage operatively connected to the bread carrier, a pair of crossed links pivotally connected to the carriage and to the upper ends of the lever arms, actuating knobs connected to the respective lever arms, requiring the application of substantially equal and opposite contracting pressures to the knobs to cause approaching movement of the upper ends of the lever arms and movement of the bread carrier into toasting position.

6. A device as set forth in claim 5 and including a pair of latch members fixedly connected with said actuating knobs, guide means forcing the knobs to move in substantially horizontal paths for the major portions of their travel, the knobs and latch members being free to move vertically at the ends of their approaching movements, a detent for engaging said latch members to hold the bread carrier in toasting position, release of the bread carrier from toasting position requiring simultaneous raising of both knobs and the latch members from the detent.

FRANK W. SCHARF.